United States Patent
Andjelic et al.

(10) Patent No.: US 12,478,329 B2
(45) Date of Patent: Nov. 25, 2025

(54) SUTURES WITH COATINGS FOR DETECTING AND REPORTING TISSUE INFECTION

(71) Applicant: Ethicon, Inc., Somerville, NJ (US)

(72) Inventors: Sasa Andjelic, Somerville, NJ (US); Leo B. Kriksunov, Ithaca, NY (US)

(73) Assignee: Ethicon, Inc., Raritan, NJ (US)

( * ) Notice: Subject to any disclaimer, the term of this patent is extended or adjusted under 35 U.S.C. 154(b) by 926 days.

(21) Appl. No.: 17/520,963

(22) Filed: Nov. 8, 2021

(65) Prior Publication Data
US 2023/0141333 A1  May 11, 2023

(51) Int. Cl.
*A61B 5/00* (2006.01)
*A61B 5/145* (2006.01)
(Continued)

(52) U.S. Cl.
CPC ........ *A61B 5/6883* (2013.01); *A61B 5/14539* (2013.01); *A61B 5/14735* (2013.01); *A61B 2017/00004* (2013.01); *A61B 17/06166* (2013.01); *A61B 2017/06176* (2013.01); *A61B 2090/3925* (2016.02); *A61B 2090/3966* (2016.02); *A61B 2090/3995* (2016.02); *A61B 2562/12* (2013.01)

(58) Field of Classification Search
CPC .............. A61B 5/6883; A61B 5/14539; A61B 5/14735; A61B 17/06166; A61B 2017/00004; A61B 2017/06176; A61B 2090/3925; A61B 2090/3966; A61B 2090/3995; A61B 2562/12; A61B 2017/00898; A61B 2017/00964; A61B 90/39; A61L 17/145
See application file for complete search history.

(56) References Cited

U.S. PATENT DOCUMENTS 6,577,904 B1  6/2003  Zhang et al.
6,749,554 B1  6/2004  Snow et al.
(Continued)

FOREIGN PATENT DOCUMENTS

WO  2017204803 A1  11/2017
WO  2020236174 A1  11/2020

OTHER PUBLICATIONS

"International Search Report and Written Opinion Received For PCT Application No. PCT/IB2022/060301", Mailed Date Jan. 31, 2023, 17 Pages.
(Continued)

*Primary Examiner* — Justin Xu
(74) *Attorney, Agent, or Firm* — David R. Crichton; Leo B. Kriksunov

(57) ABSTRACT

The present invention is directed to an implantable medical device, comprising: a device body, with at least a portion of said body coated by a sensing coating that comprises an echogenic material or a radiopaque material, or combinations thereof, said sensing coating configured to dissolve or swell in presence of at least one infection biomarker; wherein a portion of said sensing coating is covered by a protective film, forming a protected portion, said protected portion configured not to dissolve or swell in presence of said biomarker and methods of detecting presence of biomarkers in the vicinity of an implanted medical device.

18 Claims, 6 Drawing Sheets

(51) Int. Cl.

| | |
|---|---|
| *A61B 5/1473* | (2006.01) |
| *A61B 17/00* | (2006.01) |
| *A61B 17/06* | (2006.01) |
| *A61B 90/00* | (2016.01) |
| *A61L 17/14* | (2006.01) |

(56) References Cited

U.S. PATENT DOCUMENTS

| | | |
|---|---|---|
| 10,245,356 B2 | 4/2019 | Ayres et al. |
| 2004/0193055 A1* | 9/2004 | Field ................ A61L 29/18 |
| | | 600/458 |
| 2011/0264138 A1 | 10/2011 | Avelar |
| 2016/0296765 A1* | 10/2016 | Corbitt, Jr. ........... A61B 17/06 |
| 2017/0348090 A1 | 12/2017 | Saint et al. |
| 2019/0046684 A1* | 2/2019 | Roth ................ A61L 27/54 |
| 2021/0169579 A1* | 6/2021 | Laviola .............. A61B 34/20 |

OTHER PUBLICATIONS

Leaper, et al., "The Role of Antimicrobial Sutures in Preventing Surgical Site Infection", Ann R Coll Surg Engl.; vol. 99: pp. 439-443, 2017.

\* cited by examiner

SUTURES WITH COATINGS FOR DETECTING AND REPORTING TISSUE INFECTION

FIELD

The field of art to which this invention relates is absorbable or non-absorbable medical devices, such as monofilament sutures or multifilament such as braided sutures, more specifically surgical sutures configured for detecting and reporting presence of tissue infections and or abnormal vs. normal tissue healing after suture installation into the tissue.

BACKGROUND

Surgical sutures and attached surgical needles are well known in the art for use in a variety of conventional surgical procedures. For example, such sutures may be used to approximate tissue about incisions or lacerations in epidermal layers and underlying fascia layers, join blood vessel ends, attach tissue to medical devices such as heart valves, repair body organs, repair connective tissue, etc. Conventional surgical sutures may be made from known biocompatible materials, particularly synthetic and natural biocompatible polymeric materials, which may be non-absorbable or absorbable. Examples of synthetic non-absorbable polymeric materials useful to manufacture non-absorbable sutures include polyesters, polyolefins, polyvinylidene fluorides and polyamides. Further examples of non-absorbable materials are polyethylene, polypropylene, nylon, and similar polymers. Examples of synthetic absorbable polymeric materials useful to manufacture absorbable sutures include polymers and copolymers made from lactones such as the lactides, glycolide, p-dioxanone, epsilon-caprolactone, and trimethylene carbonate. The term absorbable is meant to be a generic term, which may also include implantable devices that bioabsorbable, resorbable, bioresorbable, degradable or biodegradable in the living body or tissue. The term non-absorbable is meant for implantable devices that are permanently installed in the living body or tissue.

Sutures are preferred by surgeons for use in many surgical procedures because of several advantages and properties possessed by such sutures. Absorbable sutures must be capable of providing the desired tensile strength in vivo for a sufficient period of time to allow for effective tissue healing. Wound healing is dependent on the nature of the specific tissue as well as the healing characteristics of the individual undergoing the surgical procedure. For example, poorly vascularized tissue is likely to heal more slowly than highly vascularized tissue; likewise, diabetic patients and the elderly tend to heal more slowly as well. There are thus opportunities to provide suture materials that can match the healing characteristics of a variety of wounds. Any implant, such as a suture, appears as a foreign body to the patient's immune system. In addition, it is known that implantable medical devices, including sutures, may provide a platform for the attachment of bacteria and the subsequent formation of bacterial biofilms. It was found beneficial for sutures to have antimicrobial properties.

Surgical sutures are designed to have the requisite physical characteristics to assure desirable and efficacious in vivo behavior. Absorbable sutures need to retain appropriate tensile strength during the required healing period; this is typically characterized as breaking strength retention (BSR). In order to obtain the required design properties, it is necessary to provide absorbable polymers and manufacturing processes that will yield absorbable sutures with the required properties.

Likewise, the retention of mechanical properties, including, e.g. tensile strength and knot strength, post-implantation, is often a very important and critical feature of an absorbable medical device. The device must retain mechanical integrity until the tissue has healed sufficiently. In some bodily tissues, healing occurs more slowly, requiring an extended retention of mechanical integrity. As mentioned earlier, this is often associated with tissue that has poor vascularization. Likewise, there are other situations in which a given patient may be prone to poor healing, e.g., the diabetic patient.

Surgical site infection (SSI) presents a burden to healthcare with significant morbidity and mortality. According to a recent study "The role of antimicrobial sutures in preventing surgical site infection", Leaper, et al., Ann R Coll Surg Engl., 2017; 99: 439-443, SSIs may double hospital stay. After open elective colorectal surgery, the SSI rate has been estimated at 17.5%; after sternotomy for general cardiac surgery at 1.7% and after coronary artery bypass grafting at 2.4%, with a time to peak presentation of 6-8 days, which may be several days after the patient has returned home. Accurate data on SSI rates should include surveillance after discharge, using extended follow-up review, etc.

U.S. Patent Publication No. 2011/0264138A1 titled "Coded Heterofunctional Sutures And Methods" discloses a heterofunctional surgical filament comprising a plurality of sections wherein: at least one section has features different from the features of at least one other section, and said at least one section has at least one demarcation which allows it to be distinguished from said at least one other section.

U.S. Pat. No. 6,577,904 titled "Ultrasound echogenic cardiac lead" discloses a lead assembly comprising: a flexible lead body extending from a proximal end to a distal end, the lead body including at least one conductor disposed therein, the flexible lead body including an outer surface; a first layer of echogenic material completely encapsulated by the flexible lead body; an electrode assembly including at least one electrode electrically coupled with the conductor; the first layer of echogenic material is disposed directly on or in the conductor at a first location; and a second layer of echogenic material disposed directly on or in the conductor at a second location.

U.S. Pat. No. 10,245,356 titled "Medical devices with non-uniform coatings for enhanced echogenicity" discloses a medical device comprising a coating for ultrasound detection, said coating comprising microparticles that are visible with ultrasound, wherein the microparticles are solid throughout, wherein the diameter of at least 60% of said microparticles on said medical device is between 10 and 45 µm and the density of said microparticles per surface area is between 45 and 450 particles/mm$^2$, and wherein said coating is applied as a pattern that spatially selectively covers parts of the surface.

U.S. Pat. No. 6,749,554 titled "Medical tools and devices with improved ultrasound visibility" discloses a medical or surgical device or tool that is a radioactive source suitable for use in brachytherapy that is designed to be implanted or inserted inside the human or mammalian body, having at least part of its' surface coated whereby the ultrasound visibility of said device or tool in vivo is enhanced, characterized in that the coating comprises one or more of the following: (i) a matrix material containing a plurality of contrast enhancing elements; (ii) magnesium; (iii) a liquid or polymer which alters its ultrasound imaging properties upon elevating the temperature from ambient to physiological temperature; (iv) a liquid or polymer which alters its ultrasound imaging properties as a result of a change in pH; an essentially non-polymeric bio-compatible compound which forms a discontinuous coating.

PCT Patent publication No. WO2020/236174A1 titled "Biodegradable Supporting Device With A Radio-Opaque Marker" discloses a biodegradable stent comprising: a biodegradable metal scaffold comprising a plurality of interconnected struts, each strut comprising a strut body having a luminal side, a luminal surface, an abluminal side and an abluminal surface, wherein at least one strut comprises an open space extending into the strut body from the luminal surface, the abluminal surface, or between the luminal surface and the abluminal surface; and a radio-opaque marker disposed in the open space.

BRIEF DESCRIPTION

Briefly, the present invention relates to an implantable medical device, comprising: a device body, with at least a portion of said body coated by a sensing coating that comprises an echogenic material or a radiopaque material, or combinations thereof, said sensing coating configured to dissolve or swell in presence of at least one infection biomarker; wherein a portion of said sensing coating is covered by a protective film, forming a protected portion, said protected portion configured not to dissolve or swell in presence of said biomarker.

The present invention further relates to a method of detecting presence of biomarkers in and around of an implanted medical device, comprising: 1) coating at least a portion of said device body with a sensing coating that comprises an echogenic material or a radiopaque material, or combinations thereof, said sensing coating configured to dissolve or swell in presence of at least one infection biomarker; 2) coating a portion of said sensing coating with a protective film, forming a protected portion, said protected portion configured not to dissolve or swell in presence of said biomarker; and 3) detecting dissolution or swelling or lack thereof of said sensing coating in areas not protected by said protective film.

The implantable medical device is configured for implantation into a tissue and for detecting presence of biomarker from outside of tissue using ultrasonic imaging, X-ray imaging, or combinations thereof.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation.

The forms disclosed herein are illustrated by way of example, and not by way of limitation, in the figures of the accompanying drawings and in which like reference numerals refer to similar elements and in which:

FIG. 1 shows a schematic cross-sectional view of an embodiment of implantable suture and coatings of the present invention.

FIG. 2 shows a schematic view of an embodiment of suture of the present invention implanted into tissue.

FIG. 3 shows a schematic view on an imaging device of an embodiment of suture of the present invention implanted into tissue.

FIG. 4 shows a schematic view of an embodiment of suture of the present invention implanted into tissue.

FIG. 5 shows a schematic view on an imaging device of an embodiment of suture of the present invention implanted into tissue.

FIG. 6 shows a schematic view of an embodiment of suture of the present invention implanted into tissue.

FIGS. 7A, 7B show a schematic view on an imaging device of an embodiment of suture of the present invention implanted into tissue.

FIG. 8 shows a schematic view of an embodiment of suture of the present invention implanted into tissue.

FIG. 9 shows a schematic view on an imaging device of an embodiment of suture of the present invention implanted into tissue.

FIG. 10 shows a schematic view of an embodiment of suture of the present invention implanted into tissue.

FIG. 11 shows a schematic view on an imaging device of an embodiment of suture of the present invention implanted into tissue.

Figure 12:
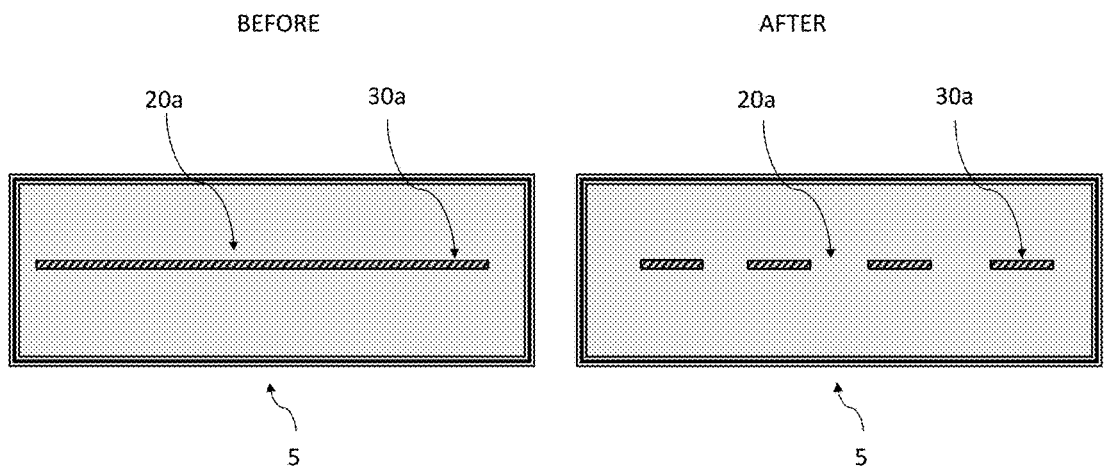

FIG. 12 shows schematic views on an imaging device of an embodiment of suture of the present invention implanted into tissue.

Figure 13:
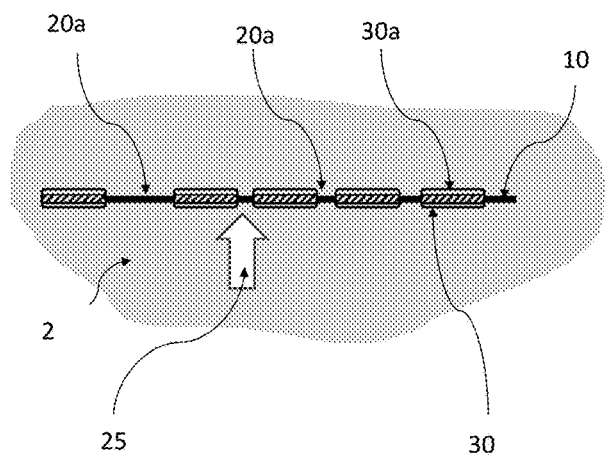

FIG. 13 shows a schematic view of an embodiment of suture of the present invention implanted into tissue.

Figure 14:
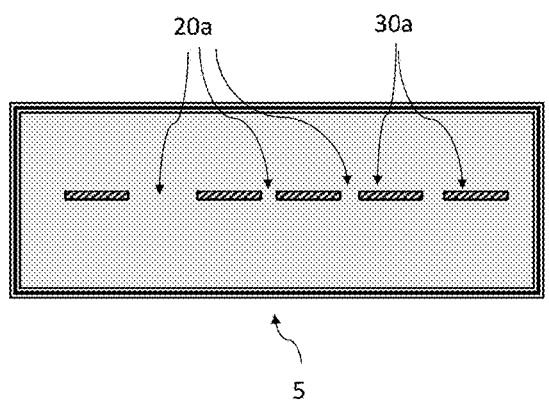

FIG. 14 shows a schematic view on an imaging device of an embodiment of suture of the present invention implanted into tissue.

Figure 15:
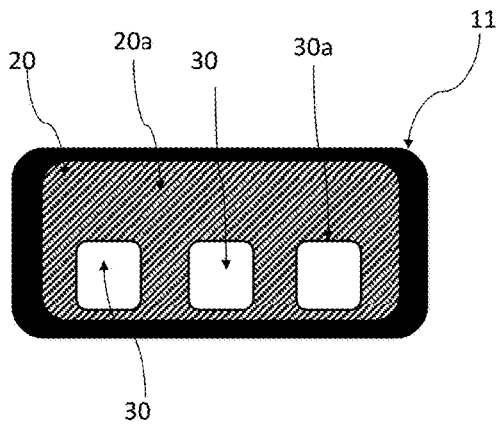

FIG. 15 shows a schematic view of an embodiment of implantable device of the present invention.

Figure 16:
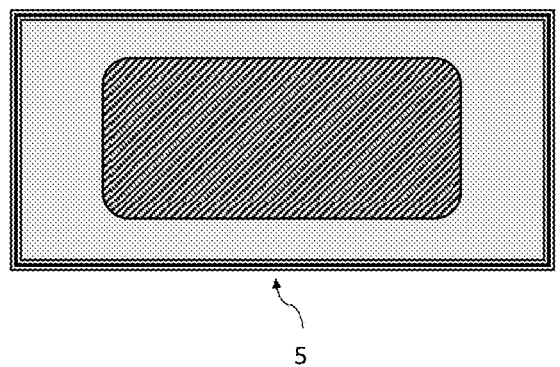

FIG. 16 shows a schematic view on an imaging device of an embodiment of implantable device of the present invention.

Figure 17:
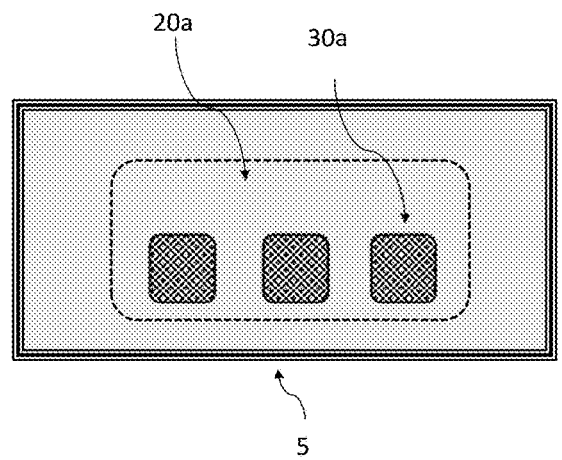

FIG. 17 shows a schematic view on an imaging device of an embodiment of implantable device of the present invention.

DETAILED DESCRIPTION

Sensing Coating

According to an embodiment of the present invention, an implantable medical device, such as surgical suture comprises a sensing coating that is an ultrasonically imageable and visible using available ultrasonic imaging equipment, (e.g. echogenic coating) or radio-imaging imageable and visible under X-ray (e.g. radiopaque coating) characterized in that the implanted device is detectable from outside the body, using existing body and tissue imaging techniques known to a skilled artisan. The inventive coating is configured for reacting and changing (such as dissolving or swelling, or similar) in presence or absence of specific markers in vivo, and thus is configured for detecting presence of physical, biological, or chemical markers associated with surgical wound and tissue infection and/or poor healing, and sensing/reporting the state of the wound/tissue healing for subsequent corrective action, if needed, such as topical and/or systemic administration of medicants, corrective surgery, explanation, etc.

The medical device itself, such as surgical suture, itself can be any commercially available or approved suture, including, absorbable or non-absorbable, monofilament or braided, knotless (barbed), or fixated by knots, or combinations of the above.

Figure 1:
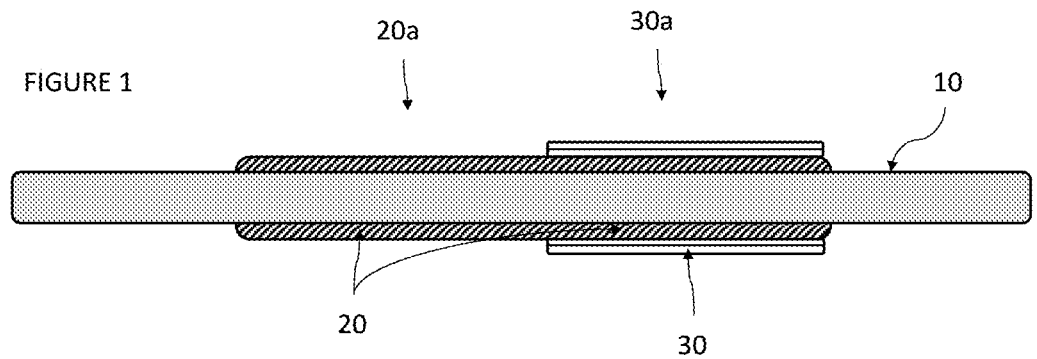

Referring to FIG. 1, in one embodiment, an elongated flexible suture 10 has at least a portion of the suture coated by a sensing coating 20. Coating 20 is a sensing coating in that coating 20 is formulated to dissolve or swell in the presence of infection markers, such as low pH or high pH as compared to a normal body tissue pH. Other biomarkers that can affect coating 20 are infective microorganisms (bacteria), antibodies, antigens, amino acids, growth factors, cytokines, chemokines, and any know marker of wound infection.

Coating 20 is further formulated to be readily imageable from outside the body, such as with coating 20 incorporating echogenic materials or radiopaque materials, that are detectable by imaging equipment (ultrasound, X-ray, MRI) from outside of the body.

The sensing coating can further comprise a polymer that is faster dissolving/resorbing at pH farther from tissue pH, and echogenic particles or microbubbles of gas distributed throughout the polymer. Polymer can be a polyester such as lactide-glycolide copolymer combined with enteric methacrylate copolymers such as methyl-methacrylate copolymers (Eudragit L and S), and methacrylic acid ethyl acrylate copolymer (Eudragit L30D). Other preferred choice of coating polymers for enteric formulations may include hydroxypropyl methylcellulose acetate succinates, and/or cellulose acetate phthalates.

In some embodiments, upon exposure to environment with present infection markers, such as low pH or high pH as compared to a normal body tissue pH, unprotected coating 20 will swell or dissolve in about 6 to 12 to 24 hours and up to about 2, 3, 4, 5, 6, 7 days, more preferably in 12 hours to 48 hours.

In some embodiments, sensing coating 20 is swelling or dissolving in alkaline pH characteristic of infected wound, such as at pH values above 7.5, 8, 8.5, 9, 10.

Echogenic Coating

Echogenic coatings incorporate materials with acoustic impedance different from that of the underlying medical device e.g., suture 20, and surrounding medium (e.g., biological tissue or fluids). In particular, reflective materials scatter the ultrasound waves in all directions and make the medical device more easily imageable with ultrasound.

The coating can comprise a biocompatible polymeric matrix or binder filled with sound reflective particles. Sound reflective particles can be gas filled microspheres or microbubbles, such as polymeric microspheres, glass microspheres, or similar, with size ranging from about 1 micron to about 200 microns, more preferably 3 to 50 microns, such as 5 microns.

In some embodiments, echogenic coating comprises a polymeric matrix having a plurality of void spaces, such as a polymer in a form of a gas bubble filled material or foam, whereby a liquid polymer prior to application as a coating is infused with gas micro-bubbles and then applied to suture and cured or solidified. In some embodiments, gas microbubbles are formed in a coating as the coating is being dried or cured at elevated temperature. In one embodiment, gas microbubbles are formed from a carbonate salt upon heating, or from an acidic component and a gas-forming salt admixed into the coating, such as citric acid and a carbonate, e.g., sodium or calcium carbonate forming $CO_2$ microbubbles on heating.

In some embodiments, echogenic coating comprises a polymeric matrix with a highly developed or roughened surface.

The thickness of the coating is selected so as to provide for good imaging from outside the body, typically in the range from about 3 microns to about 300 microns, more preferably 10-150 microns.

Radiopaque Coating

Radiopaque coatings incorporate materials with higher radiopacity than that of the underlying medical device e.g., suture 20, and surrounding medium (e.g., biological tissue or fluids). The coatings absorb x-rays, making the treated sutures easily visible using fluoroscopy. Radiopaque coatings can be applied in any chosen pattern and can achieve up to 100% attenuation of a fluoroscopic spectrum.

The polymer based coating material may incorporate various biologically compatible radiopaque materials, such as metal films or particles, e.g. silver particles, salts, etc. Barium or tungsten can be included to enable the device to be radiographically imageable.

The thickness of the coating is selected so as to provide for good imaging form outside the body, typically in the range from about 0.5 microns to about 300 microns, more preferably 5-150 microns Protective Film Still referring to FIG. 1, a portion of sensing coating 20 is further protected by a protective coating or protective film 30. Protective coating or film 30 is formulated to be resistant in presence of infection markers, such as low pH or high pH as compared to a normal body tissue pH, i.e. film 30 will not dissolve or swell in the presence of infection markers as unprotected coating 20 does, or will dissolve or swell after a longer period of exposure compared to unprotected coating 20, such as 2 to 20 times longer period, such as over 10 times longer.

Protective coating 30 is not readily imageable from outside the body, i.e., it incorporates no echogenic materials (if ultrasonic detection is being used) or radiopaque materials (if X-ray imaging is being used) or MRI-high contrast materials (if Mill is being used). Protective coating 30 is essentially transparent to selected imaging modalities such as ultrasound, or X-ray, or MRI, or similar. Areas of suture 10 coated with sensing coating 20 have substantially the same image on imaging modalities such as ultrasound, X-ray, MRI if these areas are further coated or not coated with protective coating 30.

As shown, a portion 20a of suture 10 coated by coating 20 with sensing coating 20 directly exposed because it is not covered by protective coating 30. On the protected portion 30a of suture 10 coated by coating 20 and further covered by protective coating 30, sensing coating 20 is not directly exposed because it is covered by protective coating 30.

Installation and Imaging

Figure 2:
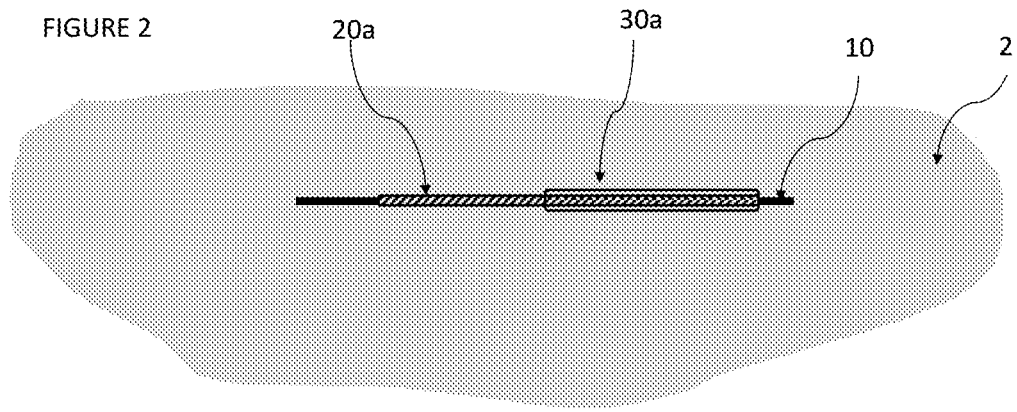

FIG. 2 schematically shows suture 10 installed/implanted into tissue 2, immediately after installation. As shown, a portion 20a of suture 10 coated by coating 20 with sensing coating 20 directly exposed to tissue 2 because it is not covered by protective coating or film 30. On the portion 30a of suture 10 coated by coating 20 and further covered by protective coating 30, sensing coating 20 is not directly exposed to tissue 2 because it is covered by protective coating 30.

Figure 3:
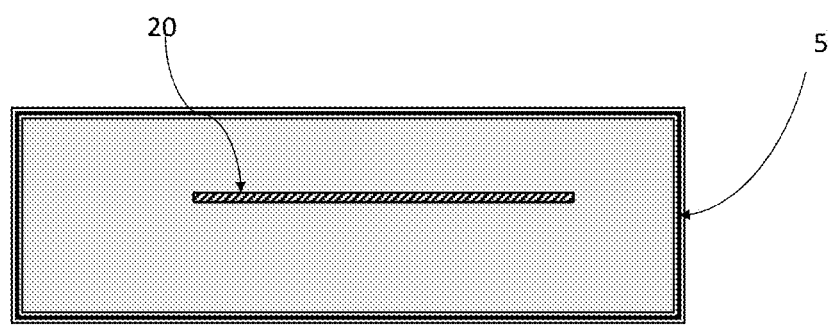

FIG. 3 schematically shows image 5 on an imaging device which is imaging suture 10 of FIG. 2, whereby suture 10 itself and protective coating 30 itself have low visibility or invisible (not shown in FIG. 3), while sensing coating 20 is visible due to echogenic or radiopaque components, including visible under protective coating 30.

Reaction and Detection of Biomarkers

Advantageously, when inventive suture is installed into tissue and there is no marker present to which sensing coating 20 is configured to react and dissolve, imaging of suture 10 in the body will be showing the image similar to FIG. 3, showing intact sensing coating 20 along suture 10. However, when the marker to which sensing coating 20 is configured to react and dissolve is present, a portion of sensing coating 20a that is not protected by protective coating 30 will start reacting with the marker, resulting in modification of the sensing coating in the area 20a. One such modification can be dissolution of sensing coating 20 in the area 20a. Conversely, a portion of sensing coating 30a that is protected by protective coating 30 will not be reacting with the marker due to protection by film 30, resulting in no modification of the sensing coating in the area 30a.

Figure 4:
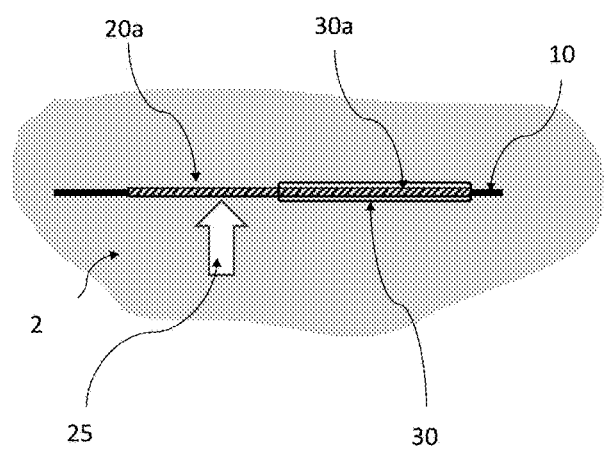
Figure 5:
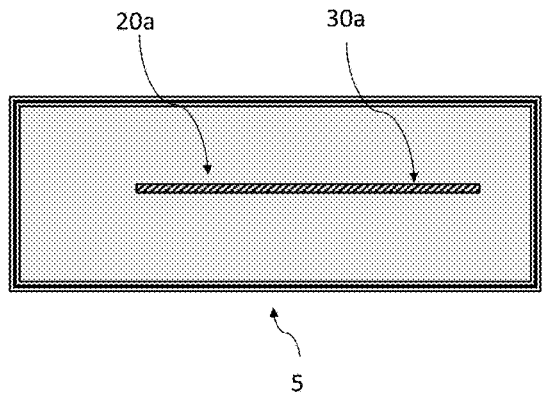

FIG. 4 shows suture 10 installed into tissue 2, with marker (such as low pH or high pH) present in the tissue and that react with sensing coating in area 20a as shown by arrow 25. Presence of marker has no effect on area 30a protected by protective coating 30. While sensing coating in area 20a is still intact, i.e. at the beginning of the process, images acquired by imaging devices will look similar to schematics shown in FIG. 5, with both areas 20a and 30a showing on imaging due to intact sensing coating 20 in both areas 20a and 30a.

Figure 6:
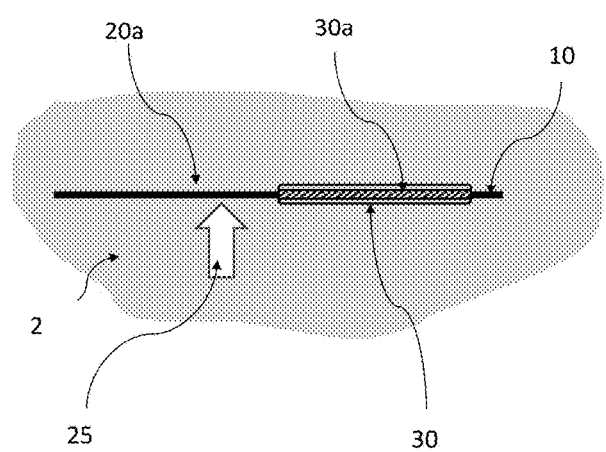
Figure 7A:
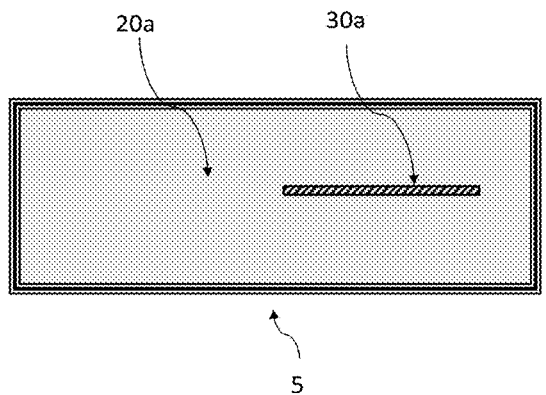
Figure 7B:
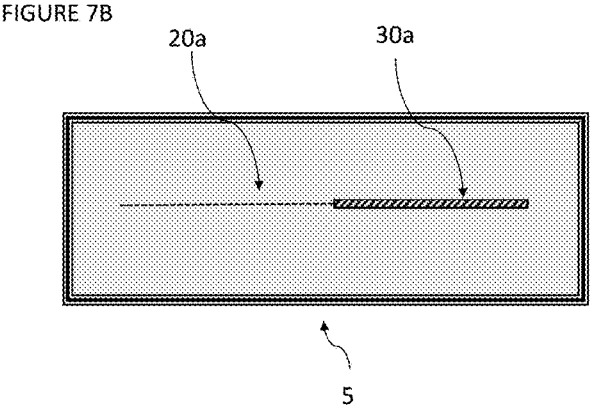

FIG. 6 shows suture 10 installed into tissue 2, with marker 25 (such as low pH or high pH) present in the tissue and fully affecting unprotected sensing coating 20 in area 20a, resulting in complete dissolution of coating 20 there. Coating 20 is not shown, but the area 20a a still shown for clarity on suture 10. Sensing coating 20 in area 30a is intact because it is protected by film 30. With sensing coating 20 in area 20a dissolved, images acquired by imaging devices will look similar to schematics shown in FIG. 7A, 7B, with only area 30a clearly showing on imaging, due to presence of intact sensing coating 20. Area(s) 20a will not be clearly visible as seen in FIG. 7A, or have low visibility/being only just visible as shown in FIG. 7B.

Accordingly, imaging of suture 10 from outside the body will result in detecting of dissolution of sensing coating 20 in unprotected area 20a indicating presence of marker 25 in tissue 2.

In embodiments, sensing coating 20 is an echogenic coating comprising air-filled microbubbles embedded into a coating matrix, soluble at low pH or at high pH.

Figure 8:
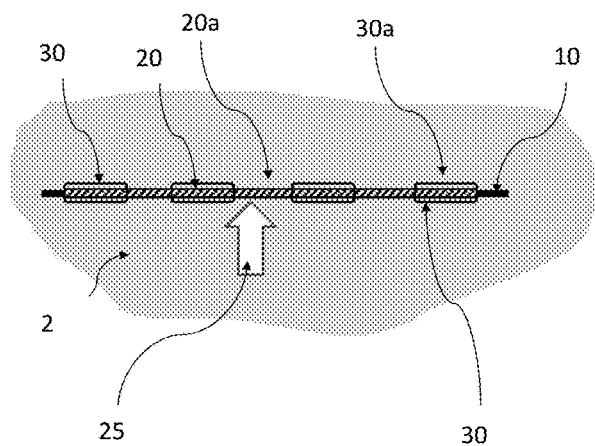

As shown in FIG. 8, in some embodiments, sensing coating 20 is applied to all or most of suture 10, while protective coating is applied intermittently to portions of sensing coating 20, leaving uncoated gaps 20a between coated areas 30a. While sensing coating in area 20a is still intact, due to the absence of reactive biomarkers, or at the beginning of the process or immediately after installation, images acquired by imaging devices will look similar to schematics shown in FIG. 9, with both areas 20a and 30a showing on imaging.

Figure 10:
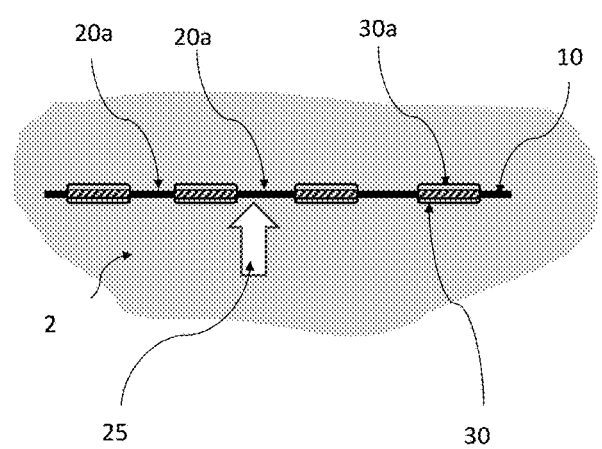

FIG. 10 shows suture 10 installed into tissue 2, with marker 25 (such as low pH or high pH) present in the tissue and fully affecting or attacking unprotected sensing coating 20 in areas 20a, resulting in complete dissolution of sensing coating 20 in areas 20a. Coating 20 in areas 20a is not shown, but the area 20a is still shown for clarity on suture 10. With sensing coating 20 in area 20a dissolved, images acquired by imaging devices will look similar to schematics shown in FIG. 11, with only area 30a showing on imaging, resulting in a dash line like images, with no suture 10 images visible in areas 20a. Such characteristic and easily differentiable image can indicate the presence of marker and the need to remedy the wound healing, by applying appropriate treatments, medicants, explanation, etc.

Figure 9:
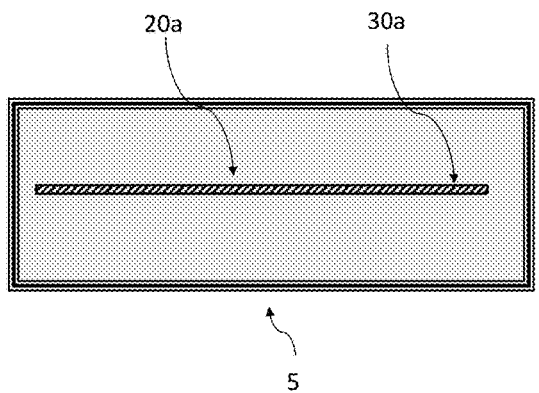
Figure 11:
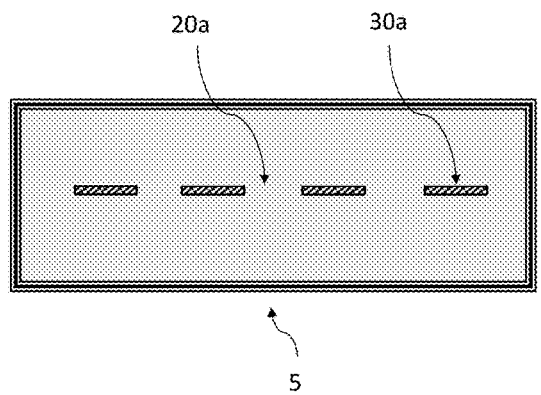

Comparing acquired images of suture 10 shown in FIGS. 9 and 11, with differences developing with marker 25 (such as low pH or high pH) present and fully affecting unprotected sensing coating 20, resulting in complete dissolution of sensing coating 20 in areas 20a, shows to a health practitioner that there is a detected presence of the marker 25. Such side-by-side comparison of acquired images of the same suture 10, before and after action of marker 25, illustrated in FIGS. 9 and 11, is shown for illustration side-by-side in FIG. 12 as before and after simulated images.

The length of areas 20a and 30a can be the same, as shown, or different, whereby areas 20a are shorter than 30a or longer. A pattern can also have various combinations of 20a and 30a areas lengths. As shown in FIG. 13, in one embodiment the sensing coating 20 dissolution pattern can be 3 shorter areas 20a followed by a long area 20a, with corresponding areas 30a in-between, resulting in easily detected pattern on imaging devices, as schematically shown in FIG. 14.

Advantageously, as shown in FIGS. 8, 10, 13, a plurality of portions 20a coated by sensing coating but not coated by protective film 30 are interspersed with protected portions 30a, with areas 20a followed by areas 30a, followed by areas 20a and so on along at least one axis of the implantable device. In embodiments, areas 20a are interdigitated with areas 30a.

Referring to FIG. 15, a general view of an implantable device 11 is shown, with sensing coating 20 protected in some areas by protective film 30, forming portions 20a coated by sensing coating but not coated by protective film 30, portions 20a are interspersed with protected portions 30a. FIG. 16 schematically shows imaging of device 11 with both areas 20a and 30a showing on imaging. FIG. 17 schematically shows imaging of device 11 after dissolution of sensing coating 20 in areas 20a with only discrete areas 30a showing on imaging.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. The scope of the present invention should be considered in terms of the following claims and is understood not to be limited to the details of structure and operation shown and described in the specification and drawings. While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims.

We claim:

1. An implantable medical device, comprising:
   a) A device body, with at least a portion of said body coated by
   b) a sensing coating that comprises an echogenic material or a radiopaque material, or combinations thereof,
   wherein said sensing coating dissolves or swells in presence of at least one infection biomarker,
   wherein
   1) a portion of said sensing coating is covered by a protective film that forms at least one protected portion, wherein said protected portion do not dissolve or swell in presence of said biomarker,
   2) the medical device configured for detection of presence of the infection biomarkers by imaging and detection of dissolution or lack thereof of the unprotected portion in comparison to the protected portion,
   3) wherein on said device body, a plurality of portions coated by said sensing coating but not coated by said protective film are interspersed with said protected portions, wherein said portions coated by said sensing coating but not coated by said protective film are adjacent to said protected portions.

2. The implantable medical device of claim 1, wherein said device comprises a surgical suture.

3. The implantable medical device of claim 2, wherein said surgical suture is absorbable or non-absorbable.

4. The implantable medical device of claim 2, wherein said surgical suture is monofilament or braid.

5. The implantable medical device of claim 2, wherein said surgical suture is barbed or knotless suture.

6. The implantable medical device of claim 1, wherein said device is configured for implantation into a tissue and detects the presence of said at least one biomarker from outside of said tissue using ultrasonic imaging, X-ray imaging, or combinations thereof.

7. The implantable medical device of claim 6, wherein detecting presence of said at least one biomarker from outside of said tissue is performed by using imaging for comparatively detecting dissolution or swelling of said sensing coating and lack of dissolution or swelling of said protected portion of said sensing coating.

8. The implantable medical device of claim 1, wherein said biomarker comprises a pH differential from standard.

9. The implantable medical device of claim 1, wherein said echogenic material comprises gas-filled microbubbles embedded into said sensing coating.

10. A method of detecting presence of biomarkers in the vicinity of an implanted medical device, comprising:
    a) coating at least a portion of said device body with a sensing coating that comprises an echogenic material or a radiopaque material, or combinations thereof,
    wherein said sensing coating dissolves or swells in presence of at least one infection biomarker;
    b) coating a portion of said sensing coating with a protective film to form at least one protected portion, said protected portion configured to not dissolve or swell in presence of said biomarker;
    c) detecting dissolution or swelling or lack thereof of said sensing coating in areas not protected by said protective film,
    wherein on said device body, a plurality of portions coated by said sensing coating but not coated by said protective film are interspersed with said protected portions, wherein said portions coated by said sensing coating but not coated by said protective film are adjacent to said protected portions.

11. The method of claim 10, wherein said device comprises a surgical suture.

12. The method of claim 11, wherein said surgical suture is absorbable or non-absorbable.

13. The method of claim 11, wherein said surgical suture is monofilament or braid.

14. The method of claim 11, wherein said surgical suture is barbed or knotless suture.

15. The method of claim 10, wherein detecting dissolution or swelling or lack thereof is performed using ultrasonic imaging, X-ray imaging, or combinations thereof.

16. The method of claim 10, wherein detecting presence of said at least one biomarker is performed by using imaging by comparatively detecting dissolution or swelling of said sensing coating and lack of dissolution or swelling of said protected portion of said sensing coating.

17. The method of claim 10, wherein said biomarker comprises a pH differential from a standard.

18. The method of claim 10, wherein said echogenic material comprises gas-filled microbubbles embedded into said sensing coating.

* * * * *